US012667842B2

(12) United States Patent
Mendonsa et al.

(10) Patent No.: US 12,667,842 B2
(45) Date of Patent: Jun. 30, 2026

(54) DIRECTIONAL CONTROL ON A MICROFLUIDIC CHIP

(71) Applicant: Seagate Technology LLC, Fremont, CA (US)

(72) Inventors: Riyan Alex Mendonsa, Edina, MN (US); Gemma Mendonsa, Edina, MN (US); Brett R. Herdendorf, Mound, MN (US)

(73) Assignee: Seagate Technology LLC, Fremont, CA (US)

( * ) Notice: Subject to any disclaimer, the term of this patent is extended or adjusted under 35 U.S.C. 154(b) by 1014 days.

(21) Appl. No.: 17/869,972

(22) Filed: Jul. 21, 2022

(65) Prior Publication Data

US 2023/0049708 A1 Feb. 16, 2023

Related U.S. Application Data

(60) Provisional application No. 63/226,987, filed on Jul. 29, 2021.

(51) Int. Cl.
*B01L 3/00* (2006.01)
*H01F 1/44* (2006.01)
*H01F 7/06* (2006.01)

(52) U.S. Cl.
CPC ............ *B01L 3/50273* (2013.01); *H01F 1/44* (2013.01); *H01F 7/06* (2013.01);
(Continued)

(58) Field of Classification Search
None
See application file for complete search history.

(56) References Cited

U.S. PATENT DOCUMENTS 6,287,825 B1 9/2001 Weissman et al.
9,315,846 B2 4/2016 Pascoguin et al.
(Continued)

FOREIGN PATENT DOCUMENTS

WO 2016065300 A1 4/2016

OTHER PUBLICATIONS

Yi Zhang, Nam-Trung Nguyen, Magnetic digital microfluidics—a review, Lab Chip, 2017, 17, 994-1008. (Year: 2017).*
(Continued)

*Primary Examiner* — Neil N Turk
*Assistant Examiner* — Benjamin Joseph Kass
(74) *Attorney, Agent, or Firm* — Westman, Champlin & Koehler, P.A.

(57) ABSTRACT

A microfluidic system includes a fluidic platform having a surface, a first liquid disposed onto the fluidic platform, and a droplet disposed onto the first liquid. The first liquid has a first temperature. The droplet has a second temperature higher than the first temperature so that the droplet is levitated above the first liquid by a cushion of vapor of the first liquid. In an embodiment, a device is configured to provide a magnetic field that has variable strength across the surface. A location of a magnetic droplet relative to the surface area is affected by the magnetic field. A method includes providing a fluidic platform, providing a magnetic field, introducing a first liquid onto the fluidic platform, introducing a first magnetic droplet onto the first liquid, and locally varying the magnetic field.

22 Claims, 9 Drawing Sheets

(52) U.S. Cl.
CPC .................. *B01L 2200/0647* (2013.01); *B01L 2300/0645* (2013.01); *B01L 2400/043* (2013.01)

(56) References Cited

U.S. PATENT DOCUMENTS

| | | | |
|---|---|---|---|
| 10,260,087 B2 | 4/2019 | Coll Mulet et al. | |
| 10,774,044 B2 | 9/2020 | Cooks et al. | |
| 11,789,015 B2 * | 10/2023 | Pamula | B01L 3/502792 435/7.1 |
| 2006/0141626 A1 | 6/2006 | Hauge et al. | |
| 2007/0196834 A1 | 8/2007 | Cerrina et al. | |
| 2011/0124049 A1 | 5/2011 | Li et al. | |
| 2017/0356477 A1 | 12/2017 | Anand et al. | |
| 2021/0054364 A1 | 2/2021 | Rausch et al. | |
| 2021/0054368 A1 | 2/2021 | Rausch et al. | |
| 2021/0054447 A1 | 2/2021 | Chang | |

OTHER PUBLICATIONS

Y.S. Song, D. Adler, F. Xu, E. Kayaalp, A. Nureddin, R.M. Anchan, R.L. Maas, & U. Demirci, Vitrification and levitation of a liquid droplet on liquid nitrogen, Proc. Natl. Acad. Sci. U.S.A. 107 (10) 4596-4600, (2010). (Year: 2018).*

Xichuan Rui, Shuren Song, Wei Wang, Jia Zhou; Applications of electrowetting-on-dielectric (EWOD) technology for droplet digital PCR. Biomicrofluidics Nov. 1, 2020; 14 (6): 061503. (Year: 2020).*

Koziej, D. ; Floryan, C. ; Sperling, R. A. ; Ehrlicher, A. J. ; Issadore, D. ; Westervelt, R. ; Weitz, D. A. Microwave dielectric heating of non-aqueous droplets in a microfluidic device for nanoparticle synthesis. Nanoscale 2013, 5 5468-5475. (Year: 2013).*

Yang, C., Li, G. A novel magnet-actuated droplet manipulation platform using a floating ferrofluid film. Sci Rep 7, 15705 (2017). (Year: 2017).*

Commissariat, Tushna, “Levitating drops controlled by fridge magnets,” Physics World, May 17, 2012.

Piroird, K. et al., “Magnetic control of Leidenfrost drops,” Physical Review E 85, 056311, American Physical Society, May 23, 2012.

Piroird, K. et al., “Reshaping and capturing Leidenfrost drops with a magnet,” Mar. 26, 2013.

Narhe, R. et al., “Inverted Leidenfrost-life effect during condensation,” Langmuir 2015, 31, 5353-5363, American Chemical Society, Mar. 25, 2015.

Adda-Bedia, M. et al., “Inverted Leidenfrost effect: Levitating drops on liquid nitrogen,” Langmuir 2016, American Chemical Society, Apr. 2016.

Irfan, A. et al., “Steering paramagnetic Leidenfrost drops in an inhomogeneous magnetic field,” Aug. 28, 2018.

D’Angelo, C. et al., “Ferrofluid Leidenfrost droplets,” Soft Matter, Royal Society of Chemistry, 2019, 15 (29), pp. 5945-5950, Jan. 6, 2020.

Alimohammadian, M. et al., “Manipulating electronic structure of graphene for producing ferromagnetic graphene particles by Leidenfrost effect-based method,” Scientific Reports 10, 6874 (2020), www.nature.com, Apr. 23, 2020.

Kouzoudis, D., et al. “Magnetic Hyperthermia in the 400-1,100 KHz Frequency Range Using MIONs of Condensed Colloidal Nanocrystal Clusters,” Frontiers in Materials, vol. 8, Article 638019, doi: 10.3389/fmats.2021.638019, May 5, 2021.

Collins et al., “Radiofrequency Heating Pathways for Gold Nanoparticles,” HHS Public Access, Nanoscale, 6(15):8459-8472, doi:10.1039/c4nr00464g, Aug. 7, 2014.

* cited by examiner

DIRECTIONAL CONTROL ON A MICROFLUIDIC CHIP

CROSS REFERENCE TO RELATED APPLICATIONS

This application claims the benefit of priority of U.S. Provisional Patent Application No. 63/226,987, filed Jul. 29, 2021, which is hereby incorporated by reference in its entirety.

SUMMARY

In one embodiment, a microfluidic system comprises a fluidic platform having a surface, a first liquid disposed onto the fluidic platform, and a droplet disposed onto the first liquid. The first liquid has a first temperature. The droplet has a second temperature higher than the first temperature so that the droplet is levitated above the first liquid by a cushion of vapor of the first liquid.

In another embodiment, a microfluidic system comprises a fluidic platform having a surface, a device configured to provide a magnetic field that has variable strength across the surface, a first liquid disposed onto the fluidic platform, and a magnetic droplet disposed onto the first liquid. The first liquid has a first temperature. The magnetic droplet has a second temperature higher than the first temperature so that the magnetic droplet is levitated above the first liquid by a cushion of vapor of the first liquid.

In yet another embodiment, a method comprises providing a fluidic platform, providing a magnetic field, introducing a first liquid onto the fluidic platform, introducing a first magnetic droplet onto the first liquid, and locally varying the magnetic field. The fluidic platform has a surface. The magnetic field has variable strength across the surface. The first liquid has a first temperature. The first magnetic droplet has a second temperature higher than the first temperature so that the first magnetic droplet is levitated above the first liquid by a first cushion of vapor of the first liquid. The first magnetic droplet is selectively steered over the surface area by locally varying the magnetic field.

Other features and benefits that characterize embodiments of the disclosure will be apparent upon reading the following detailed description and review of the associated drawings.

Figure 1:
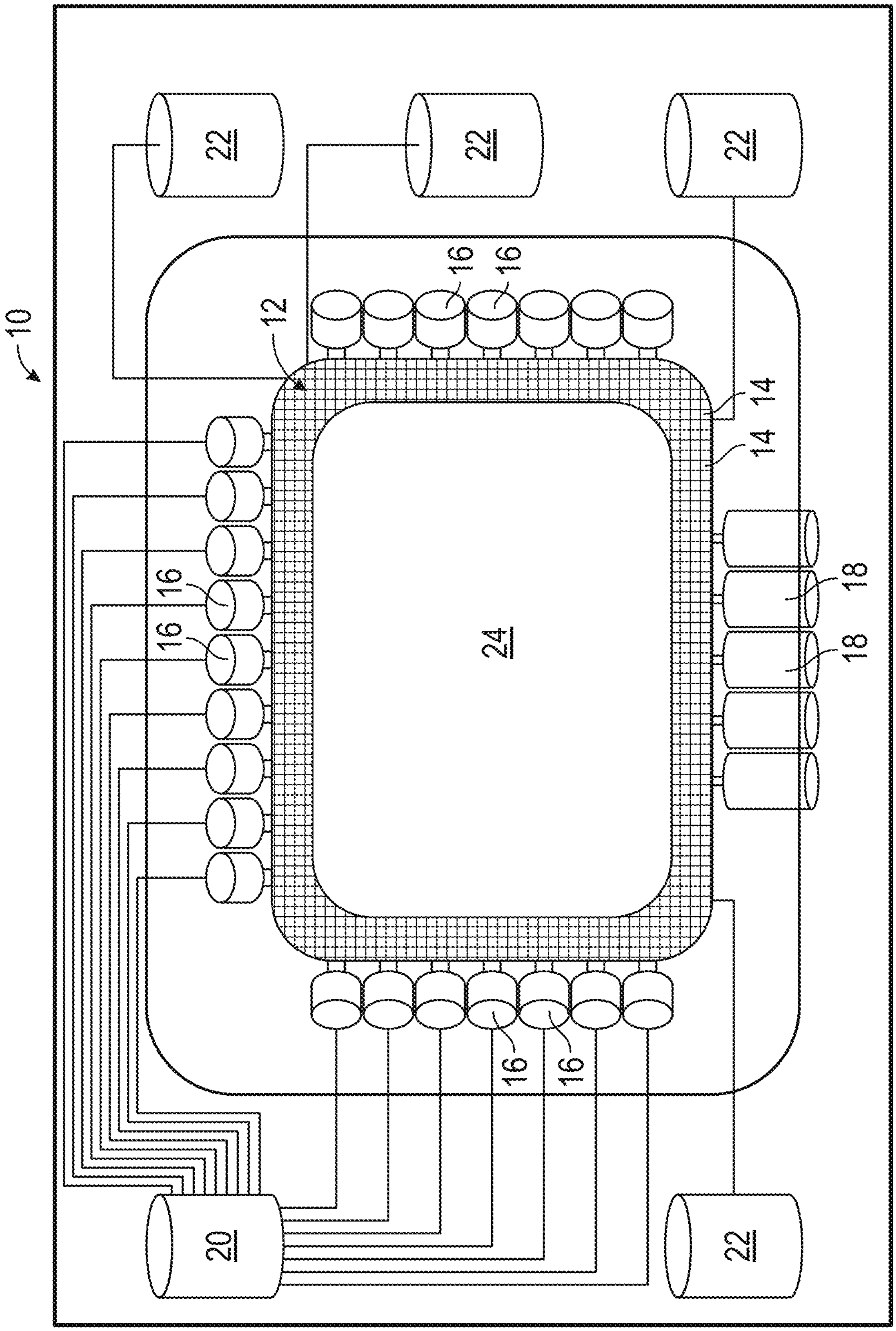
FIG. 1 is a schematic diagram of a system incorporating an exemplary microfluidic chip.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

Detailed Description of Illustrative Embodiments

Commonly known data storage devices utilize magnetic storage media, such as hard disks. The storage capacity of hard disk drives (HDDs) has steadily increased due to an increase in areal density provided by such technological advances as perpendicular recording, shingled magnetic recording (SMR), heat-assisted magnetic recording (HAMR), interleaved magnetic recording (IMR), microwave-assisted magnetic recording (MAMR), and helium filling, for example. There is an ongoing need for more data storage and increased writing to and reading from that storage.

Deoxyribonucleic acid (DNA) is an emerging technology for data storage because of its ability to store biological, such as genetic, information. Using current methods, a DNA strand or gene, to store 5 kilobyte of data, can be written in about fourteen days. Comparatively, magnetic disk drives and magnetic tapes both can write 1 terabyte in about an hour. Thus, there is interest in building DNA strands, or genes, more quickly.

In general, embodiments of the disclosure relate to microfluidic systems and operations, such as those used for a lab-on-a-chip, useful for processing reactions at a high rate, on a small scale. In synthesizing a DNA gene on a lab-on-a-chip, cross contamination can be a significant problem, especially if paths are overlapping between chemicals, symbols, or linkers, or when surfaces are shared between multiple mixtures. Thus, embodiments of the disclosure use an inverse Leidenfrost effect to levitate a droplet and magnetism to control its directional motion, so that reagent paths are controlled to prevent unwanted or premature contact.

As background, the Leidenfrost reaction occurs when a surface is so hot that when a liquid is dropped onto it, the bottom layer of the liquid that encounters the hot surface instantly evaporates (due to the great temperature difference) and forms an insulating vapor cushion for the rest of the droplet, such that it levitates over the hot surface and can move across the surface near frictionlessly. However, the drop can be consumed in the evaporation process.

With an inverse Leidenfrost effect, the temperature difference is provided by a very cold (such as liquid nitrogen) layer on the chip. When a droplet is dropped or otherwise introduced onto the cold liquid layer, the liquid nitrogen itself evaporates and forms a vapor cushion for the droplet, such that the droplet levitates over the extremely cold surface and can move across the surface near frictionlessly. In this case, the volume of the droplet is preserved because it is the liquid nitrogen that evaporates. The near-frictionless motion allows for much faster reactions. When the droplet is introduced to the liquid nitrogen surface, the direction of motion is determined by the angle of incidence of the droplet and variations while it settles onto the surface. Conventionally, this is not easily controlled, and the droplet will continue in a given direction until it encounters another droplet, boundary, discontinuity or instability.

This disclosure relates to choosing a magnetic droplet, or adding magnetic nanoparticles (MNP) to a fluid droplet, so that its direction can be controlled with a magnetic field. By controlling the motion of drops across the surface of a microfluidic cell, cross contamination by contact of different substances can be controlled and reduced. The magnetic force can be movable or can be provided by an array of multiple selectively energizable electromagnets.

Lab-on-a-chip is a common term for an integrated circuit ("chip") on which one or several laboratory functions or chemical reactions are performed. The chip can have a form factor of a few square centimeters. Labs-on-a-chip handle extremely small fluid volumes (for example, measured as pico-liters) and are often called microfluidic systems. In digital microfluidics (DMF), the lab-on-a-chip has a hydrophobic "chip platform" on which fluid droplets (e.g., liquid droplets) can be manipulated by precisely controlled voltage application. The platform may have a cover plate covering the fluidic area. By utilizing the feature of surface tension of the fluid on the platform, the fluid can be precisely moved across the platform by voltage applied to the platform, configured such as in a grid.

Using techniques such as voltage differential on the platform, the dispensed DNA symbols and linkers are moved on (across) the platform and mixed in the desired steps. All mixing can be accomplished on the platform; alternatively, a dedicated mixing station may be used for one or more of the joining steps, for example those utilizing heat and/or agitation. In some implementations, the platform may include a controllable reaction facilitator, such as an ultraviolet (UV) light source.

One suitable physical size for a lab-on-a-chip is about 20 mm by 20 mm, which is compatible to an 8 inch wafer and could have 785,000 array elements, each array element having controllable voltage independently applied thereto. In some implementations, each well or other storage compartment for a reaction component is 10× the size of an array element. This would provide 66,560 wells and leave 119,000 arrays for transport and mixing of the symbols and linkers on the platform. A stacked or otherwise three-dimensional array of labs-on-a-chip would increase density and decrease areas for synthesis. A drop elevator could be used to provide synthesis on multiple vertically stacked levels.

A cleaning or decontamination mechanism may be included in the lab-on-the-chip to rinse, wash, or otherwise decontaminate certain or all grid locations that have had or will have a reaction component present thereon. For example, an amount (a drop, for example) of cleaning solution (such as hydrogen peroxide, for example) can be applied to and moved across the platform to cleanse the platform. In one particular example, the cleaning solution can follow immediately behind a reaction component, thus cleaning and decontaminating the surface of any residue that may remain. In another particular example, the cleaning solution can clean a path ahead of a reaction by tracing the path a reactant will follow.

FIG. 1 is a schematic diagram of an exemplary embodiment of a microfluidic chip 10 to be used in a droplet transport system that offers increased directional control of a reagent droplet using an inverse Leidenfrost effect and a magnetic field. As shown in FIG. 1, in an exemplary embodiment of chip 10, a DMF grid platform 12 having voltage array elements 14 surrounds an inverse Leidenfrost pool floor or fluidic platform 24. In exemplary reactions performed using chip 10, digital microfluidic forces are used for sending a droplet 36 (shown in FIG. 2) from the DMF platform 12 onto the floor 24, and inverse Leidenfrost levitation and magnetic directional control are used for transport of the droplet 36 for most of the droplet motion over the floor or fluidic platform 24. Thus, use of chip 10 takes advantage of the benefits of both inverse Leidenfrost motion and digital microfluidic motion. For example, DMF control at the periphery of chip 10 on DMF platform 12 allows for very precise droplet control but employs many electrical connections and the application of high voltages. For most of the droplet motion, using the inverse Leidenfrost effect plus magnetic directional control over the floor 24 allows for fewer electrical connections, which use only low voltages, with high speeds and minimal or no surface contamination or cross-contamination.

In an exemplary embodiment, chip 10 includes DMF platform 12 depicted as a grid of wells or array elements 14, each array element 14 having independently controllable voltage applied thereto, to facilitate motion of a fluid droplet across the platform 12 by applied voltage. In an exemplary embodiment, a portion of the perimeter of platform 12 houses a large number of small reagent reservoirs, wells or liquid compartments 16. In an exemplary embodiment, each of the small reservoirs 16 has a volume of about 500 microliters. In an exemplary embodiment, the system includes a plurality of medium reservoirs 18, for more commonly used reagents, each of which has a larger volume capacity than a small reservoir 16. In an exemplary embodiment, some of the plurality of small reservoirs 16 are fluidly connected to a large water reservoir 20. In an exemplary embodiment, a plurality of other large reservoirs 22 is provided, each configured to contain a liquid such as silicone oil, cleaning solution, or liquid nitrogen or other cryogenic or cold temperature liquid for introduction to the platform 12 or pool floor 24. Moreover, large reservoirs 22 may be connected to receive liquid from platform 12 such as oil waste or aqueous waste.

Figure 2:
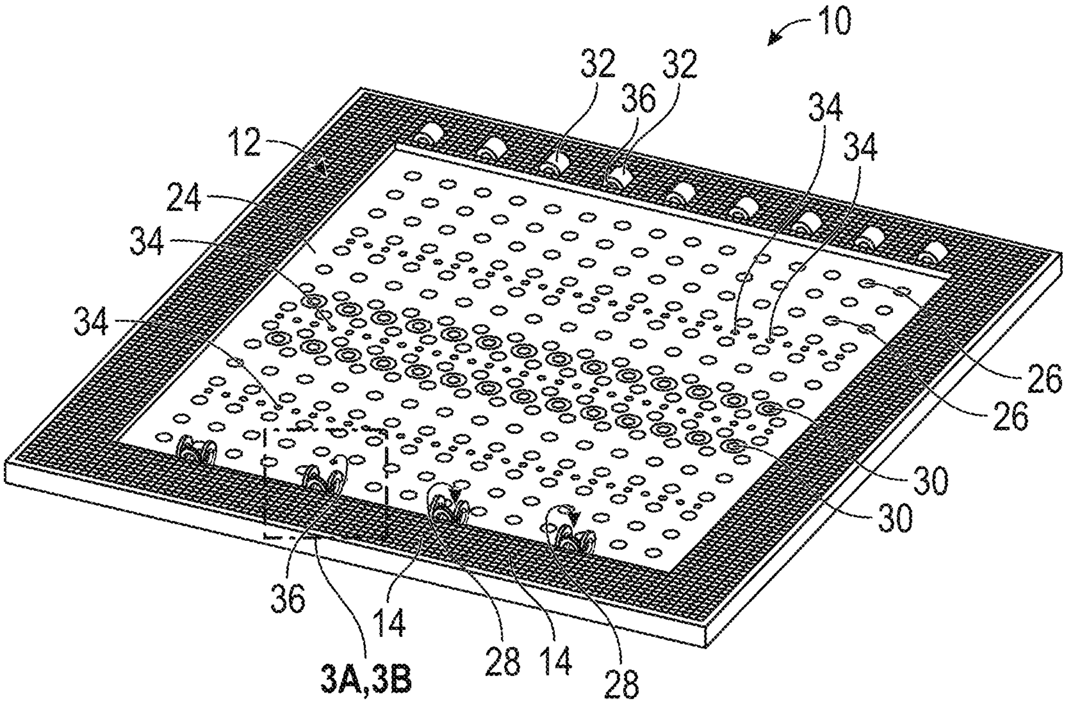
FIG. 2 is a perspective view of the exemplary microfluidic chip.

FIG. 2 is a perspective view of an exemplary chip 10 having a platform 12 configured as a frame to surround a pool floor 24. The platform 12 includes many array elements 14. Pool floor 24 in an interior of platform 12 is configured to hold a liquid on its surface such as the illustrated volume 42 (shown in FIGS. 3A and 3B) of liquid nitrogen or other suitable liquid for producing an inverse Leidenfrost effect. Also shown are various components of chip 10 that are configured to impart forces onto droplets present thereon, such as magnetic elements 26, sending coils 28, steering coils 30 and receiving coils 32. Additionally, sensors 34 are provided for detecting properties or locations of droplets on chip 10. For example, tracking of a position and concentration of MNP's of the droplet 36 can be performed by sensors 34 based on magnetic properties such as Hall effect or giant magnetoresistance (GMR).

Figure 3A:
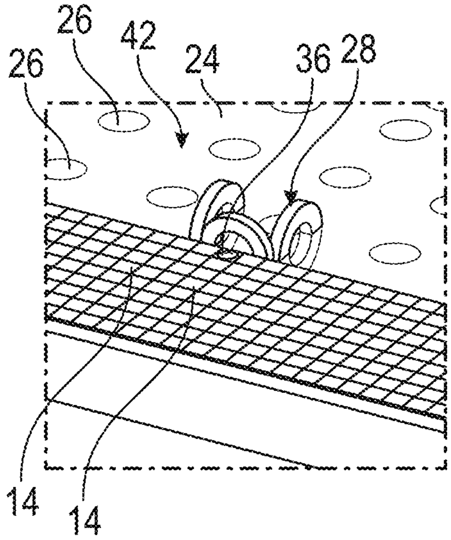
FIG. 3A is an enlarged perspective view of the portion of FIG. 2 labeled "3A, 3B."
Figure 3B:
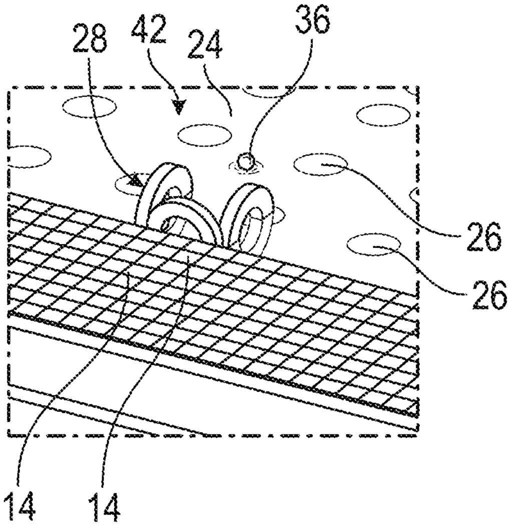
FIG. 3B is similar to FIG. 3A but shows the droplet released from a well (array element of an electrode grid) and onto a liquid surface.

As shown in FIGS. 3A and 3B, a droplet 36 of reagent or other process component is propelled onto the liquid surface of the liquid nitrogen volume 42 by energizing coils 28 in the array 14, such that the resultant magnetic force vector has the desired direction, intensity and other properties. Due to a large difference in temperature between the liquid nitrogen volume 42 and the droplet 36, the liquid surface directly in the vicinity of droplet 36 vaporizes, thereby forming a vapor cushion of nitrogen on which the droplet 36 appears to levitate over the surface 44 (labeled in FIGS. 4-6) of the volume 42. Thus, as shown in FIG. 3B, the droplet 36 may be propelled nearly frictionlessly across the floor 24 of chip 10. By using a droplet 36 that has either inherent magnetic properties or magnetism added thereto by the addition of additives such as a magnetic nanoparticles, directional control of the droplet 36 over the pool floor 24 can be achieved by motion of magnetic elements 26 and/or by selective activation of magnetic element(s) 26 in proximity of droplet 36.

Figure 4:
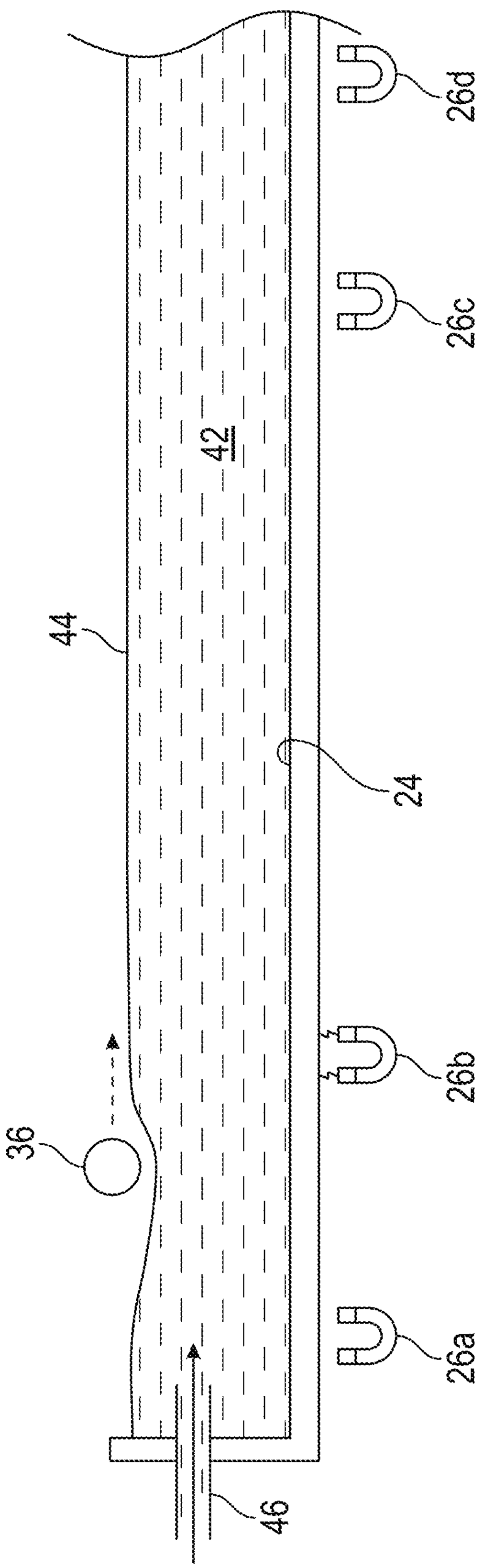
FIG. 4 is a schematic side elevation diagram of a first embodiment of a microfluidic droplet transport system.

FIG. 4 is a partial schematic diagram of a side view of a first exemplary embodiment of a microfluidic chip. A cold fluid, such as liquid nitrogen for example, is introduced onto pool floor 24 through fluid inlet 46. An array of a plurality of magnetic elements 26 is provided to act upon a droplet 36 introduced onto the fluid pool, which is levitated by the inverse Leidenfrost effect over the surface 44 of a liquid nitrogen volume 42. In the illustrated embodiment, each of the plurality of magnetic elements 26 is arranged in an array relative to platform 12 and is selectively energizable to attract the magnetic droplet 36 to its vicinity. For example, as illustrated, to move the magnetic droplet 36 away from electromagnet 26*a* and toward electromagnet 26*b*, the electromagnet 26*b* is energized to attract the droplet 36 while other electromagnets 26 are deenergized. The level and temperature of the cryogenic liquid can be controlled by the flow of the liquid through the inlet and/or outlet.

Figure 5:
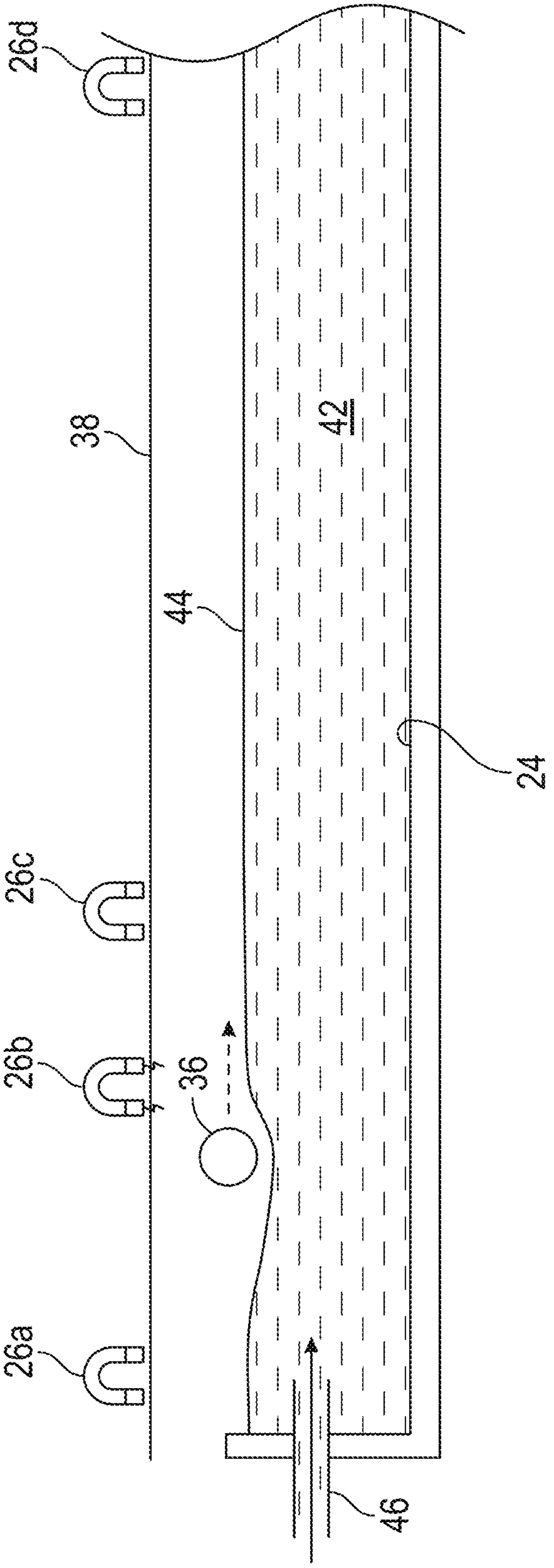
FIG. 5 is a schematic side elevation diagram of a second embodiment of a microfluidic droplet transport system.
Figure 6:
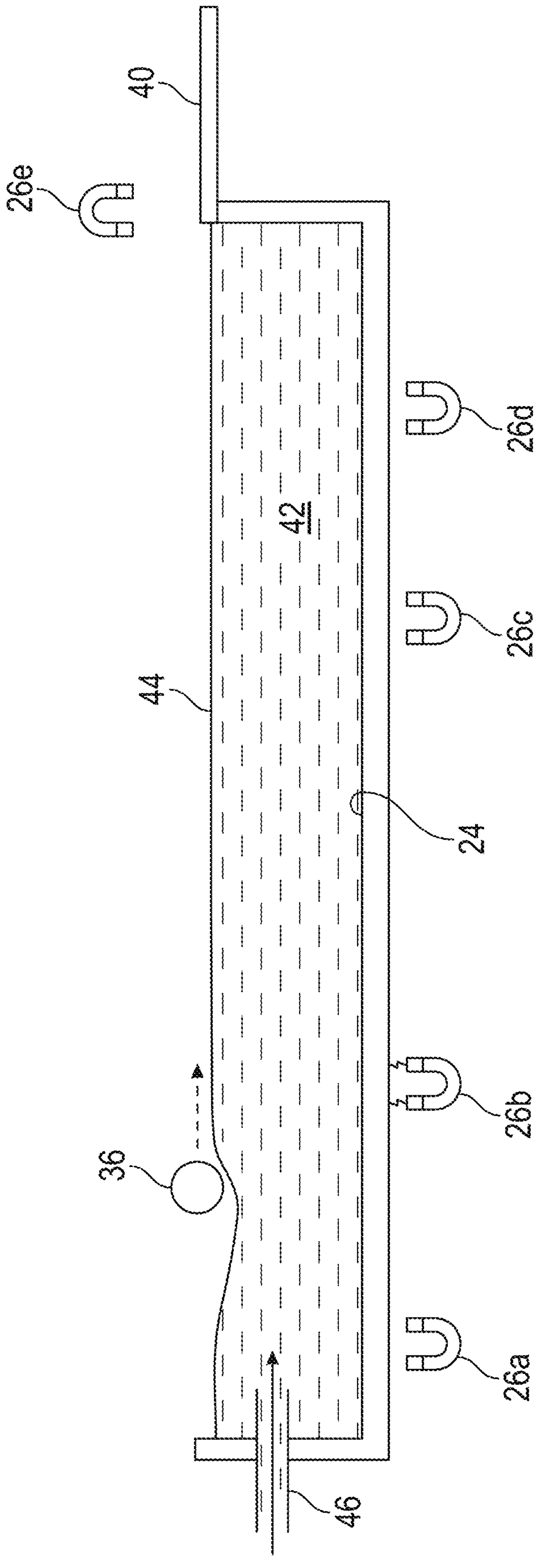
FIG. 6 is a schematic side elevation diagram of a third embodiment of a microfluidic droplet transport system.

FIG. 5 shows a configuration in which the magnetic elements 26 are positioned above the droplets 36, and wherein the chip 10 is provided with a top barrier such as cover plate 38. FIG. 6 shows an embodiment in which magnetic elements 26 are provided above and below pool floor 24, and wherein a magnetic element 26*e* helps to direct droplet 36 to a mix platform 40.

The magnetic element(s) 26 can be moveable, such as in a x-y plane defined parallel to a plane of pool floor 24, or in a z direction that is perpendicular to such a plane, or combinations thereof. Additionally, or alternatively, the magnetic elements 26 can be provided in an array of magnets or electromagnets that can be selectively energized to impart magnetic properties at desired locations relative to pool floor 24. If using multiple magnets 26, the array does not need to be equally spaced but could be configured so that magnets are focused where droplets 36 may need to change direction or be heated to a higher temperature. Droplet 36 can be formed of a single liquid or a mixture or emulsion, or can be formed as an encapsulation of immiscible liquids.

A high frequency magnetic field can be applied to a droplet 36 to heat up the magnetic nanoparticles therein. This control of temperature can be used for multiple purposes, including facilitating reactions while mixing, for example. Additionally, heating of the droplet 36 can be used to ensure that a temperature differential is maintained between the cold liquid volume 42 and the droplet 36 to cause droplet levitation due to the inverse Leidenfrost effect. Temperature control can also be used in some cases for preventing reactions. Four ferromagnetic nanoparticles ($CoFe_2O_4$, $NiFe_2O_4$, $Ni_{0.5}Zn_{0.5}Fe_2O_4$, and $Co_{0.4}Ni_{0.4}Zn_{0.2}Fe_2O_4$) with different magnetic properties were subjected to heating. The heating performance is given by the specific power loss (SPL), which was calculated from the initial slope of the heating curve. There was minimal heat loss to the surroundings, and the highest SPL was obtained, when magnetic field and frequency were highest at $2.06\times10^{-5}$ T and 348.0 kHz, respectively. When the frequency was changed from 174.8 kHz to 348.0 kHz, the SPL value doubled, indicating a one-to-one relationship between the frequency and the SPL. TABLE 1 shows sizes and magnetic properties of suitable exemplary nanoparticles, though other magnetic nanoparticles not mentioned could also be used.

TABLE 1

| Name | Grain Size (nm) | $M_r$ (emu/g) | $M_s$ (emu/g) | $H_c$ (Oe) | Joule (J/m$^3$) |
|---|---|---|---|---|---|
| $Ni_{0.5}Zn_{0.5}Fe_2O_4$ | 48.7 | 2.85 | 47.5 | 42.2 | 3266 |
| $Co_{0.4}Ni_{0.4}Zn_{0.2}Fe_2O_4$ | 46 | 3.29 | 26.2 | 75.3 | 3683 |
| $NiFe_2O_4$ | 42.9 | 3.47 | 14.8 | 146 | 6182 |
| $CoFe_2O_4$ | 34.5 | 7.01 | 22.2 | 626 | 12250 |

The desired proteins, nucleotides or chemicals could be attached to the MNP's or be free floating in a suspension along with the MNP's. In some embodiments, the droplet may be encapsulated in a casing, such as one including silicone oil, for example. In other embodiments, a droplet may be homogeneous. For example, the droplet could be a homogeneous mixture of the desired reactants/chemicals, MNP's and a suspension liquid like silicone oil. Alternatively, the droplet could be an inhomogeneous mixture that could contain a single core MNP or core collection of MNP's, along with the desired reactants attached to the MNP; the mixture could be encapsulated in a medium such as silicone oil. A variation could be an aqueous solution encapsulated by a hydrophobic layer such as silicone oil, and the MNP's could be in either layer.

Figure 8:
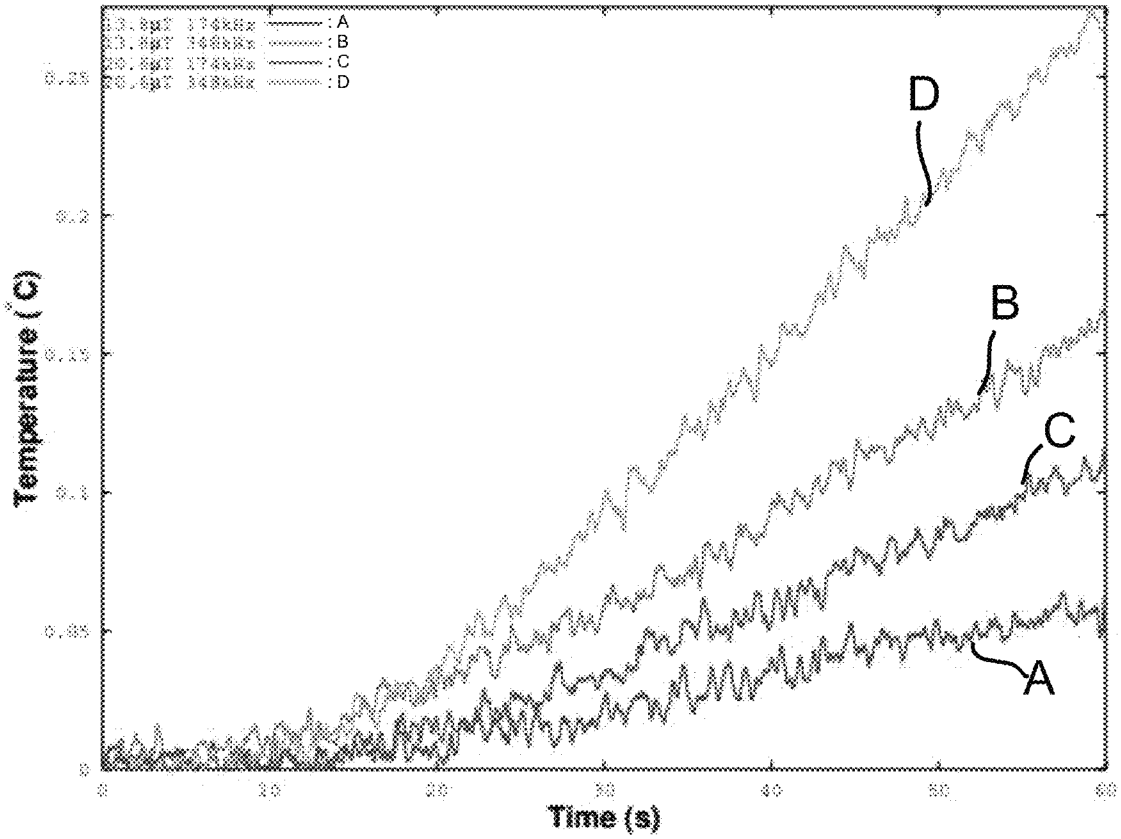
FIG. 8 is a graph of temperature against time at various frequencies for an exemplary magnetic nanoparticle (MNP).

FIG. 8 shows, for example, a graphical plot of temperature against time at various frequencies for a $CoFe_2O_4$ nanoparticle having a mass of 0.0304 g. The jagged lines show variation of the temperature of the $CoFe_2O_4$ nanoparticle with time as the sample heats up. Additional information is available in Jagoo, M. Z., Radio-Frequency Heating of Magnetic Nanoparticles, Wright State University, 2012.

Figure 9:
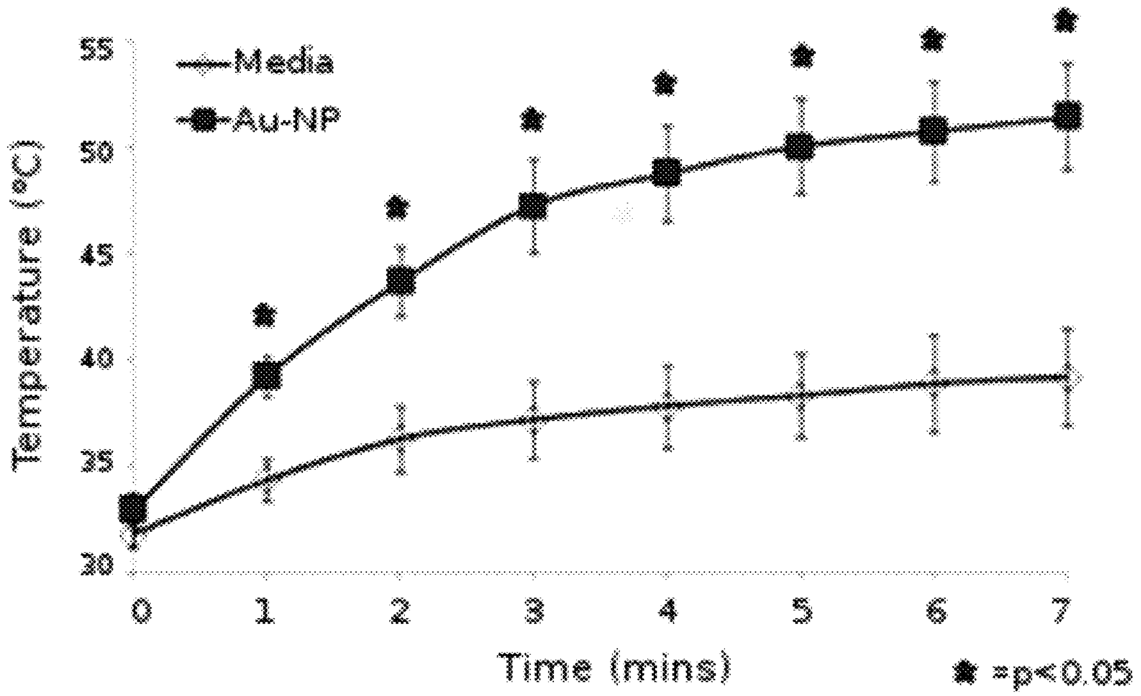
FIG. 9 is a graph of temperature against time for an in vitro cell culture with and without gold nanoparticles under radiofrequency irradiation.

FIG. 9 shows radiofrequency heating pathways for gold nanoparticles, as described in Collins et al., Radiofrequency Heating Pathways for Gold Nanoparticles, *Nanoscale.* 2014 Aug. 7; 6(15): 8459-8472. doi: 10.1039/c4nr00464 g. An in vitro cell culture demonstrates heating and cell death with cells treated with gold nanoparticles (Au-NP) in a radiofrequency (RF) field. The graph shows the temperature of HepG2 cells exposed to 35 W in the RF irradiation field in the presence (squares of top line) or absence (diamonds of bottom line) of Au-NP over a time course. Gold nanoparticles can be magnetic and thus useful for magnetic heating. For the magnetic moment of a nanocluster to interact with an external alternating magnetic field to produce heat, two mechanisms may be considered. One is Brownian or viscous heating, which assumes that the entire magnetic particle rotates to follow the directed and time varying alternating magnetic field (RFMF). The resulting viscous friction between the particle and the supporting solvent manifests as heat. The second mechanism is Néel relaxation, which occurs in media where the magnetic moment of the particle realigns with the magnetic field without particle rotation.

Figure 10:
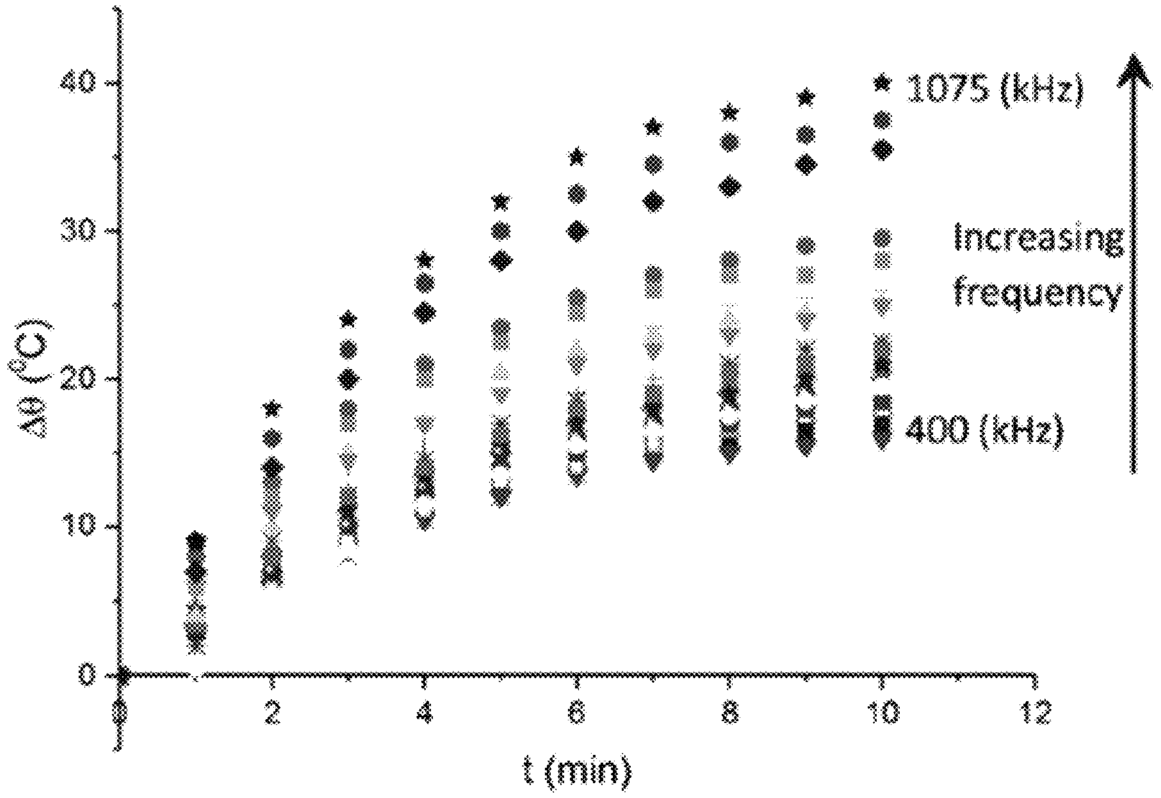
FIG. 10 is a graph showing the magnetic hyperthermia performance of condensed-clustered magnetic iron oxide nanoparticles (MIONs) in the range of 400 kilohertz (kHz) to 1.1 megahertz (MHz) at low field amplitudes.

FIG. 10 shows increased heating with increasing applied frequency for parameters tested in the references listed in TABLE 2. FIG. 10 shows the magnetic hyperthermia performance of condensed-clustered magnetic iron oxide nanoparticles (MIONs) in the range of 400 kHz to 1.1 MHz at low field amplitudes. Heat dependence, as an increasing function of frequency, with a fixed magnetic field strength of 3 mT is recorded, revealing a direct relationship between the two physical quantities and a high heating efficiency for the condensed-clustered MIONs. The specific loss power (SLP) (or specific absorption rate (SAR)) parameter, which is the ratio of the heat power in watts produced per nanoparticle mass in grams, is substantially linear to a good degree to the oscillating frequency with a step of roughly 30 W/g per 100 kHz increase. Additional information is available in Kouzoudis, D. et al., Magnetic Hyperthermia in the 400-1,100 kHz Frequency Range Using MIONs of Condensed Colloidal Nanocrystal Clusters, *Frontiers in Materials,* 5 May 2021. doi: 10.3389/fmats.2021.638019.

TABLE 2

| Reference (first named) | f | SLP (W/g) | Maximum temperature |
|---|---|---|---|
| Sudame (2020) | 751.5 kHz | 62.8-72.0 | 42° C. |
| Connord (2014) | 6-100 kHz | | |
| Salas (2014) | 77 kHz | 3,600 | |
| Garaio (2014) | 50 kHz-1 MHz | 667 | 35° C. |
| Shubitidze (2015) | 99-164 kHz | 400 | |
| Khan (2021) | 259.7, 327 & 518 kHz | 2-10 | 42° C.-46° C. |
| Rousseau (2021) | 50 kHz | 50 | +6° C. |
| Yamaminami (2021) | 1-100 kHz | 59.8 | |
| Shaterabadi (2020) | 120 kHz | 55.21 | |
| Bhardwaj (2020) | 330 kHz | | 43° C.-45° C. |
| Brizi (2020) | 340 kHz | | 35° C. |
| Kumar (2018) | 325 kHz | 543 | 43° C. |
| Hallali (2016) | 300 kHz | | |
| Bhayani (2013) | 264 kHz | | 43° C. |

Energization of selected magnetic elements 26 can be combined with voltage activation of array elements 14 to move droplets 36 across platform 12 and pool floor 24. As shown in FIG. 6, the magnetic field of magnetic element 26*e* can be used to move droplet 36 from the surface of liquid 42 and to another surface, such as mixing platform 40. By using different sizes and materials of magnetic nanoparticles in the droplets 36, different velocities can be achieved of transport, as well as different signals for heating and detection of the droplet. Droplet velocity can also be controlled by the strength of the applied magnetic field. If the temperature difference between the liquid pool 42 and the droplet 36 decreases to a point where levitation of the droplet 36 above the pool surface is no longer reliable, magnetic levitation of the droplet 36 can be achieved using the magnetic field of magnetic elements 26 located above floor 24.

Figure 7:
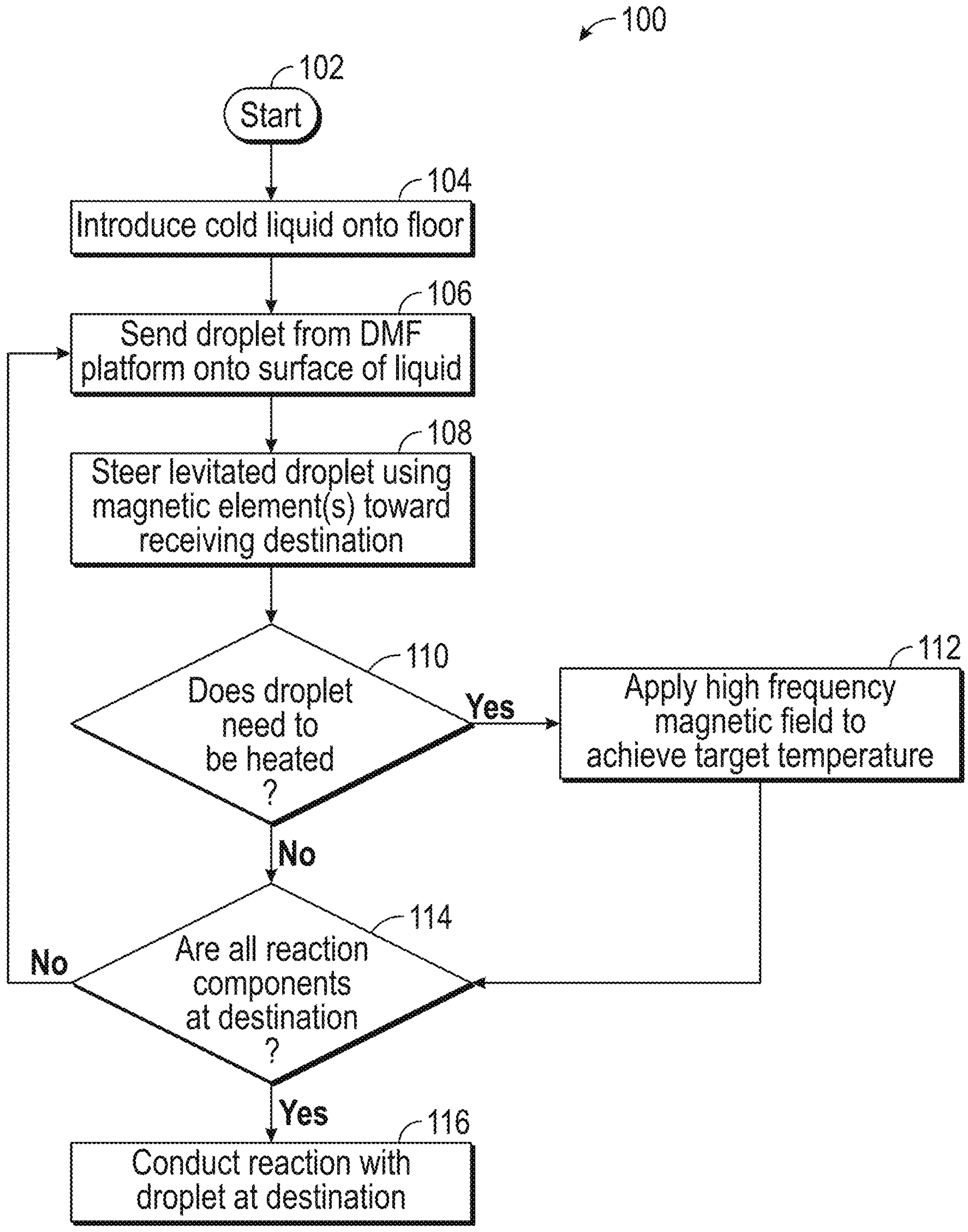
FIG. 7 is a flow chart of an exemplary method of use of the described systems and chips.

FIG. 7 is a flow chart of a method for using chip 10. Starting at 102, a user introduces cold liquid such as liquid nitrogen at 104 onto floor 24 of chip 10. At 106, the user sends a droplet 36 from the DMF platform 12 onto the surface 44 of the liquid 42. At 108, the droplet 36 is levitated above the liquid surface 44 by the inverse Leidenfrost effect, caused by a temperature difference (such as a delta of at least about 20 degrees Celsius) between the cold liquid 42 and the warmer droplet 36. The user steers the levitated droplets 36, which move quickly because of little friction, by magnetic elements 26. At 110, a query is presented about whether the droplet may need to be heated to a desired target temperature for facilitating a reaction. If the answer to the query is “yes,” the method goes to 112, where the user applies a high frequency magnetic field to the droplet 36, such as by using magnetic elements 26 to increase the droplet temperature. If the answer to query 110 is “no,” then the method moves to 114, where a query is performed regarding whether all reaction components have arrived at the reaction destination. If the answer to the query 114 is “no,” the method returns to 106, where another droplet 36 is sent from the DMF platform 12 onto the surface 44 of the liquid 42. At 114, after all components have been confirmed to have reached the reaction destination, the method moves to 116, where the reaction is conducted with all the component droplets present and at suitable temperatures. Such reaction may be facilitated with additional processing such as other mixing, for example.

Many types of reactions can by conducted on chip 10. In an exemplary embodiment, chip 10 is suitable for combining dyes for achieving color mixing, such as for inkjet and/or three-dimensional (3D) printing. In one example, a chip 10 is disposed near the exit for a printing nozzle. The chip 10 is connected to reservoirs containing different ink colors, such as reservoirs 16, 18, 22. In an exemplary embodiment, a ratio of 61 drops of cyan ink and 96 drops of yellow ink are maneuvered from the reservoirs 16, 18 and/or 22 and onto the surface 44 of the cold liquid 42. The drops are steered by magnetic elements 26 to a mixing location, where the cyan and yellow are mixed to form green. This mixing location is suitably disposed near the printer’s nozzle exit, so that the reservoirs remain pure and no mixing occurs until near the final ink deposition location. Keeping the cyan and yellow separated until they reach the nozzle location insures that there is no mixing, staining or color contamination along the route.

For use in 3D printing, for example, different polymer materials have different properties. Thus, it is sometimes desirable to mix resins. In an example, a chip 10 is disposed near the exit for a 3D printing nozzle. The chip 10 is connected to reservoirs containing different polymer materials, such as reservoirs 16, 18, 22. In an exemplary embodiment, a ratio of 10 drops of a flexible resin and 90 drops of a stiffer sirayatech blu clear resin are maneuvered from the reservoirs 16, 18 and/or 22 and onto the surface 44 of the cold liquid 42. The drops are steered by magnetic elements 26 to a mixing location, where the flexible and stiffer resins are combined to form a mixed resin of suitable intermediate stiffness. This mixing location is suitably disposed near the 3D printer's nozzle exit, so that the reservoirs remain pure and no mixing occurs until near the final resin deposition location. Keeping the flexible and stiff resins separated until they reach the nozzle location insures that there is no mixing, premature reaction, or material contamination along the route.

In many 3D printing applications, both color and material control are important. Thus, the concepts above can be applied to form resin materials of any desired colors and physical properties. Such goals can be achieved by mixing colored resins, such as those from the Henkel Loctites 3834 color resin series, with other resins and/or dyes, for example.

For use in directed electroplating, for example, different electroplating components can be mixed. In an example, a chip 10 is disposed near the exit for an electroplating nozzle. The chip 10 is connected to reservoirs containing different metallic and other materials, such as reservoirs 16, 18, 22. In an exemplary embodiment, drops of a copper sulfate or nickel sulfate and drops of chloride are maneuvered from the reservoirs 16, 18 and/or 22 and onto the surface 44 of the cold liquid 42. The drops are steered by magnetic elements 26 to a mixing location, where the drops are mixed to form an electroplating solution. This mixing location is suitably disposed near the electroplating nozzle exit, so that the reservoirs remain pure and no mixing occurs until near the final electroplating deposition location. Keeping the components separated until they reach the nozzle location insures that there is no mixing, premature reaction, or material contamination along the route.

Information regarding use of the described systems and methods for gene synthesis are provided in the commonly owned US published patent application US 2021/0054364 for "Microfluidic Lab-on-a-Chip for Gene Synthesis," which is hereby incorporated by reference.

Non-limiting, exemplary embodiments of a microfluidic system, a microfluidic chip, and a method for controlling fluid motion on a microfluidic chip are described. For example, a microfluidic system comprises a fluidic platform 24 having a surface; a magnetic field that has variable strength across the surface; a first liquid 42 disposed onto the fluidic platform, the first liquid 42 having a first temperature; and a magnetic droplet 36 disposed onto the first liquid 42. The magnetic droplet 36 has a second temperature higher than the first temperature so that the magnetic droplet 36 is levitated above the first liquid 42 by a cushion of vapor of the first liquid, via an inverse Leidenfrost effect. In exemplary embodiments, a difference between the first and second temperatures is greater than 30 degrees Celsius. In some embodiments, the difference between the first and second temperatures is greater than 50 degrees Celsius. A location of the magnetic droplet 36 relative to the surface is affected by the magnetic field.

In an exemplary embodiment, an electrode grid 12 is disposed at least on one peripheral side of the fluidic platform 24. In an exemplary embodiment, an electrode grid 12, in the form of a frame, surrounds the fluidic platform 24.

In an exemplary embodiment, a first reservoir 16, 18, 22 is configured to contain the first liquid before it is disposed onto the fluidic platform 24. In an exemplary embodiment, the magnetic droplet 36 comprises a second liquid, and the system comprises a second reservoir 16, 18, 22 configured to contain the second liquid before the magnetic droplet 36 is disposed onto the first liquid 42. In an exemplary embodiment, the magnetic droplet 36 comprises a magnetic nanoparticle. In an exemplary embodiment, the first liquid 42 comprises liquid nitrogen.

In an exemplary embodiment, the magnetic field is provided by a plurality of magnets 26. In an exemplary embodiment, the plurality of magnets 26 comprise a first magnet 26 located above the fluidic platform 24 and a second magnet 26 located below the fluidic platform 24. In an exemplary embodiment, the magnetic field is provided at least partially by an electromagnet that is selectively energizable.

In an exemplary embodiment, a microfluidic chip 10 comprises a fluidic platform 24 having a surface and configured to contain a liquid 42; an electrode grid 12 configured as a frame surrounding the fluidic platform 24; and a magnetic field that has variable strength across the surface. In an exemplary embodiment, the magnetic field is provided at least in part by a magnet 26 located below the fluidic platform 24.

In an exemplary embodiment, a method for controlling fluid motion on a microfluidic chip 10 is described. The method comprises introducing a first liquid 42 onto the fluidic platform 24. The first liquid has a first temperature. The method comprises introducing a first magnetic droplet 36 onto the first liquid 42, the first magnetic droplet 36 having a second temperature higher than the first temperature so that the first magnetic droplet 36 is levitated above the first liquid 42 by a first cushion of vapor of the first liquid, via an inverse Leidenfrost effect. The method comprises locally varying the magnetic field to selectively steer the first magnetic droplet 36 over the surface of the fluidic platform 24. In an exemplary embodiment, locally varying the magnetic field comprises selectively energizing an electromagnet over or under the fluidic platform 24.

In an exemplary embodiment, introducing the first magnetic droplet 36 comprises moving the first magnetic droplet 36 from an electrode grid 12. In an exemplary embodiment, the first magnetic droplet 36 comprises a second liquid, and the method comprises injecting the second liquid onto the electrode grid 12 from a reservoir 16, 18, 22. In an exemplary embodiment, the first magnetic droplet is obtained by combining a second liquid with a magnetic nanoparticle. In an exemplary embodiment, the first magnetic droplet 36 is heated by applying a radiofrequency to the first magnetic droplet 36. In an exemplary embodiment, a second magnetic droplet 36 is introduced onto the first liquid 42, the second magnetic droplet 36 having a third temperature higher than the first temperature so that the second magnetic droplet 36 is levitated above the first liquid 42 by a second cushion of vapor of the first liquid, via the inverse Leidenfrost effect. In an exemplary embodiment, the method comprises locally varying the magnetic field to selectively steer the second magnetic droplet 36 over the surface toward the first magnetic droplet 36. In an exemplary embodiment, the first and second magnetic droplets are combined, such as in a reaction.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent and patent application documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A microfluidic system comprising:
- a fluidic platform having a surface;
- a first liquid disposed on the fluidic platform, the first liquid having a first temperature;
  - an array of selectively energizable electrodes configured to provide digital microfluidics, the array of selectively energizable electrodes positioned adjacent to an edge of the fluidic platform, wherein the array of selectively energizable electrodes is configured to move a droplet comprising a second liquid containing magnetic nanoparticles from a location over the array of selectively energizable electrodes to a location over the fluidic platform such that the droplet is disposed over the first liquid; and
- an array of selectively energizable electromagnets positioned proximate to the fluidic platform and configured to provide:
- an alternating electromagnetic field configured to heat the magnetic nanoparticles in the droplet, thereby causing the droplet to reach a second temperature that is higher than the first temperature such that the droplet is levitated above the first liquid by a cushion of vapor of the first liquid; and
- a magnetic field that has variable strength across the surface by selectively energizing different subsets of the array of selectively energizable electromagnets, thereby causing application of a magnetic force to the magnetic nanoparticles in the droplet to move the droplet on the cushion of vapor of the first liquid.

2. The system of claim 1 wherein the array of selectively energizable electromagnets comprises at least one electromagnet located below the fluidic platform.

3. The system of claim 1 wherein the array of selectively energizable electromagnets comprises at least one electromagnet located above the fluidic platform.

4. The system of claim 1 wherein the array of selectively energizable electromagnets comprises a first electromagnet located above the fluidic platform and a second electromagnet located below the fluidic platform.

5. The system of claim 1 wherein the alternating electromagnetic field is in a radiofrequency range.

6. The system of claim 1 wherein the fluidic platform is rectangular in shape and wherein the array of selectively energizable electrodes is adjacent to and in contact with at least one side of the rectangular fluidic platform.

7. The system of claim 1 comprising a first reservoir configured to contain the first liquid before the first liquid is disposed onto the fluidic platform.

8. The system of claim 7 comprising a second reservoir configured to contain the second liquid before the droplet is disposed over the first liquid.

9. The system of claim 1 wherein the magnetic nanoparticles comprise at least one of magnetic gold nanoparticles or magnetic iron oxide nanoparticles.

10. The system of claim 1 wherein the first liquid comprises liquid nitrogen.

11. A microfluidic system comprising:
- a fluidic platform having a surface;
- a first liquid disposed onto the fluidic platform, the first liquid having a first temperature;
- an array of selectively energizable electrodes, positioned adjacent to an edge of the fluidic platform, configured to provide digital microfluidics to cause movement of a droplet comprising a second liquid containing magnetic nanoparticles from a location over the array of selectively energizable electrodes to a location over the fluidic platform such that the droplet is disposed over the first liquid;

and
- an array of selectively energizable electromagnets positioned proximate to the fluidic platform and configured to provide an alternating electromagnetic field in a radiofrequency range to heat the magnetic nanoparticles in the droplet thereby causing the droplet to reach a second temperature that is higher than the first temperature such that the droplet is levitated above the first liquid by a cushion of vapor of the first liquid.

12. The system of claim 11 wherein the array of selectively energizable electromagnets is further configured to provide a magnetic field that has variable strength across the surface by selectively energizing different subsets of the electromagnets, thereby enabling application of a magnetic force to the magnetic nanoparticles in the droplet to move the droplet on the cushion of vapor of the first liquid.

13. The system of claim 11 comprising a first reservoir configured to contain the first liquid before the first liquid is disposed onto the fluidic platform.

14. The system of claim 11 wherein the array of selectively energizable electromagnets comprises at least one electromagnet located below the fluidic platform.

15. The system of claim 11 wherein the array of selectively energizable electromagnets comprises at least one electromagnet located above the fluidic platform.

16. A method comprising:

providing a microfluidic system comprising:

a fluidic platform having a surface;

a first liquid disposed onto the fluidic platform, the first liquid having a first temperature;

an array of selectively energizable electrodes configured to provide digital microfluidics, the array of selectively energizable electrodes positioned adjacent to an edge of the fluidic platform, wherein the array of selectively energizable electrodes is configured to move a droplet comprising a second liquid containing magnetic nanoparticles from a location over the-array of selectively energizable electrodes to a location over the fluidic platform such that the droplet is disposed over the first liquid; and an array of selectively energizable electromagnets positioned proximate to the fluidic platform and configured to provide:

an alternating electromagnetic field configured to heat the magnetic nanoparticles in the droplet, thereby causing the droplet to reach a second temperature that is higher than the first temperature such that the droplet is levitated above the first liquid by a cushion of vapor of the first liquid; and a magnetic field that has variable strength across the surface by selectively energizing different subsets of the electromagnets, thereby causing application of a magnetic force to the magnetic nanoparticles in the droplet to move the droplet on the cushion of vapor of the first liquid the method further comprising:

moving, by selectively energizing a subset of the array of the selectively energizable electrodes, a first droplet comprising a second liquid containing first magnetic nanoparticles from a first location over the array of selectively energizable electrodes to a second location over the fluidic platform such that the first droplet is disposed over the first liquid; and heating the first droplet to a second temperature that is higher than the first temperature, wherein the heating of the first droplet is carried out by an alternating magnetic field provided through the array of selectively energizable electromagnets, such that the first droplet is levitated above the first liquid by a first cushion of vapor of the first liquid.

17. The method of claim 16 comprising moving the first droplet over the first liquid.

18. The method of claim 16 comprising injecting the second liquid onto the array of selectively energizable electrodes from a reservoir.

19. The method of claim 16 wherein introducing the first liquid onto the fluidic platform comprises introducing liquid nitrogen onto the fluidic platform.

20. The method of claim 16 wherein the alternating magnetic field is in a radiofrequency range.

21. The method of claim 17 comprising:

moving, by the array of selectively energizable electrodes, a second droplet comprising a third liquid containing second magnetic nanoparticles from a third location over the array of selectively energizable electrodes to a fourth location over the fluidic platform such that the second droplet is disposed over the first liquid;

heating, via the alternating electromagnetic field, the second droplet to a third temperature that is higher than the first temperature, wherein a degree of difference between the first temperature and the third temperature is such that the second droplet is levitated above the first liquid by a second cushion of vapor of the first liquid; and moving, by the array of selectively energizable electromagnets, the second droplet over the first liquid towards the first droplet.

22. The method of claim 21 comprising combining the first and second droplets.

* * * * *